United States Patent
Ohnishi et al.

[11] Patent Number: 6,039,299
[45] Date of Patent: Mar. 21, 2000

[54] DAMPER AND ELECTRONIC EQUIPMENT EMPLOYING THE DAMPER

[75] Inventors: Sei Ohnishi, Saitama; Yoshinori Hatayama, Miyagi, both of Japan

[73] Assignee: Sony Corporation, Tokyo, Japan

[21] Appl. No.: 08/994,649

[22] Filed: Dec. 19, 1997

[30] Foreign Application Priority Data

Dec. 20, 1996 [JP] Japan .................................. 8-341797

[51] Int. Cl.$^7$ .............................. F16M 13/00; F16M 1/00
[52] U.S. Cl. ............................................ 248/562; 248/638
[58] Field of Search .................................. 248/562, 638, 248/631; 360/97.02; 369/75.1, 263

[56] References Cited

U.S. PATENT DOCUMENTS

| | | | |
|---|---|---|---|
| 4,731,777 | 3/1988 | Yoshitoshi et al. | 369/263 |
| 4,794,588 | 12/1988 | Yoshitoshi et al. | 369/263 |
| 4,985,884 | 1/1991 | Watanabe et al. | 369/263 |
| 5,323,885 | 6/1994 | Fukunaga et al. | 188/381 |
| 5,379,990 | 1/1995 | Ando et al. | 267/34 |

*Primary Examiner*—Derek J. Berger
*Assistant Examiner*—Dave Heisey
*Attorney, Agent, or Firm*—Jay H. Maioli

[57] ABSTRACT

A damper interposed between a stationary portion and a movable portion for attenuating or inhibiting vibrations or shock propagated from the stationary portion to the movable portion in an electronic equipment. The damper, which has its one end and its other end mounted on the movable portion and on the stationary portion, respectively, has its main body portion formed of flexible butyl rubber. The main body portion has a hollow portion and a protuberant portion having a shaft-inserting hole and which is protruding towards the hollow portion. The protuberant portion has an outer diameter equal to not less than 2.3 times the inner diameter of the shaft inserting hole. In the hollow portion of the main body portion is enclosed a viscous fluid, such as silicone oil.

4 Claims, 15 Drawing Sheets

DAMPER AND ELECTRONIC EQUIPMENT EMPLOYING THE DAMPER

BACKGROUND OF THE INVENTION

1. Field of the Invention

This invention relates to a damper interposed between a stationary portion and a supported member for preventing propagation of vibrations or impact from the stationary portion to the supported member.

2. Description of Related Art

Up to now, for preventing propagation of the vibrations and impact to the supported member, a variety of dampers have been proposed which are interposed between a stationary portion supporting this supported member and the supported member. Referring to FIG. 1, a damper 100, in which the stationary portion is an outer casing 101 of a disc player device adapted for reproducing information signals from a recording disc and the supported member is a disc reproducing unit 102 of the disc player device, includes a bag-shaped main body portion 106 formed of a flexible material. The material of the main body portion 106 is a synthetic resin material such as butyl rubber. The open end of the main body portion 106 is closed by a flat-plate-shaped lid 105 for defining a hermetically sealed hollow portion 107. This hollow portion 107 is charged with silicone oil 108 as a viscous liquid. This damper 100 has a columnar portion 109 formed as one with the main body portion 106 and positioned in the housed state within the hollow portion 107. This substantially columnar-shaped portion 109 has a shaft inserting hole 110 extending along its axis. The shaft inserting hole 110 has a hole opening to outside the damper.

This damper 100 has its lid 105 secured to the inner wall section of the outer casing 101 and has a pivot shaft 104 set on the outer wall section of the disc reproducing unit 102 fitted into the shaft inserting hole 110. If vibrations or impact are applied to the outer casing 101, the main body portion 106 is deformed, at the same time the silicone oil 108 flows in the hollow portion 107 to prevent or suppress propagation of the vibrations or impact to the disc reproducing unit 102, as shown in FIG. 2. At this time, a force is applied which tends to shift the disc reproducing unit 102 relative to the outer casing 101, as indicated by arrow F in FIG. 2, thus deforming the main body portion 106 while shifting the columnar portion 109 within the hollow portion 107. When the columnar portion 109 is shifted in this manner, the silicone oil 108 operates as a resistance for suppressing the movement speed of the columnar portion 109. This suppression of the movement speed by the silicone oil 108 suppresses or prevents propagation of the vibrations or impact to the disc reproducing unit 102.

That is, the gain of the vibrations propagated to the disc reproducing unit 102 from the outer casing 101 is maximum at a resonant frequency $f_0$, as indicated by a rightwardly decreasing curve shown by a reference numeral (a) in FIG. 3. and becomes smaller the higher the frequency becomes than the resonant frequency $f_0$. The transmission characteristics shown by the reference numeral (a) in FIG. 3 specify the acceleration the disc reproducing unit 102 is subjected to with respect to the acceleration of the vibrations applied from outside to the outer casing 101.

On the other hand, the anti-vibration characteristics of the disc reproducing unit 102 by itself are low at a higher frequency range than 20 to 30 Hz, as indicated by a reference numeral (b) in FIG. 3. This is because the resonant frequency of a recording disc, such as a compact disc "CD" (trade mark) itself is of the order of 100 Hz. The anti-vibration characteristics of the disc reproducing unit 102 specify up to which strength of the vibrations (frequency and amplitude) the satisfactory playback state of the recording disc is maintained without interruption of the playback sound (sound skip) during reproduction of the recording disc.

The anti-vibration characteristics of a disc driver, inclusive of a damper, at a pre-set frequency, as synthesized from the anti-vibration characteristics of the disc reproducing unit 102 by itself and the transmission characteristics of the damper, may be represented by the following equation (1):

$$\gamma = \beta / (10^{\alpha/20}) \qquad (1)$$

As may be seen by a rightwardly rising curve, sufficient anti-vibration characteristics can be realized in a frequency range higher than about 20 to 30 Hz.

In the above damper 100, if the ratio of the outer diameter A of the columnar portion 109 indicated by φA in FIG. 1 to the inner diameter B of the shaft inserting hole 110 shown by φB in FIG. 1 (A/B) is as small as less than 2.3, the columnar portion 109 is deformed, as shown in FIG. 2, in case the disc reproducing unit 102 is shifted significantly relative to the outer casing 101, because the holding power of the columnar portion 109 is not sufficient to keep its own shape, thus occasionally producing a gap P between the inner surface of the shaft inserting hole 110 and the pivot shaft 104.

If the columnar portion 109 is deformed such as to produce this gap P, the multiplication factor of resonant vibrations corresponding to the gain of the vibrations propagated at the resonant frequency $f_0$ among the transmission characteristics of the damper 100 is increased, thus raising the gain of the vibrations in the high frequency range. If the gain of the vibrations indicated by the reference numeral (a) in FIG. 3 among the transmission characteristics of the damper 100 is increased, the anti-vibration characteristics of the disc reproducing unit 102, inclusive of the damper 100, indicated by the reference numeral (c), are lowered, because the denominator of the above equation (1) is increased. Moreover, if the multiplication factor of resonant vibrations is increased, the amplitude of the disc reproducing unit 102 with respect to the outer casing 101 at the resonant frequency $f_0$ is increased such that there arises the risk of the disc reproducing unit 102 impinging against the inner wall section of the outer casing 101. For evading this collision, it is necessary to provide a sufficient air gap between the disc reproducing unit 102 and the inner wall section of the outer casing 101. However, if a sufficient air gap is provided between the disc reproducing unit 102 and the inner wall section of the outer casing 101, the outer casing becomes bulky.

For lowering the multiplication factor Q of resonant vibrations, it may be contemplated to lower the consistency of the silicone oil 108, as provided in JISK2220, or to lower the hardness of the material of the main body portion 106. However, in this case, since not only the resonant frequency $f_0$ but also the gain of the vibrations in the frequency range not lower than 20 Hz to 30 Hz are raised, the anti-vibration characteristics in the frequency range not lower than 20 Hz to 30 Hz among the transmission characteristics of the damper 100 cannot be improved sufficiently.

Conversely, the consistency of the silicone oil 108 or the hardness of the material making up the main body portion 106 may be increased for lowering the resonant frequency $f_0$. However, in this case, the multiplication factor of resonant vibrations is increased such that again the anti-vibration characteristics of the disc reproducing unit 102 inclusive of the damper 100 in the frequency range not lower than 20 Hz to 30 Hz cannot be improved sufficiently.

For example, referring to FIG. 4 showing transmission characteristics of a damper having a higher consistency (that is lower viscosity) of the silicone oil 108 than that of the damper 100 shown in FIG. 3, the resonant frequency fo of the damper of FIG. 4 becomes smaller, however, its multiplication factor of resonant vibrations is increased.

Also, referring to FIG. 5 showing transmission characteristics of a damper having a still higher consistency (that is lower viscosity) of the silicone oil 108 than that of the damper shown in FIG. 4, the resonant frequency $f_0$ of the damper of FIG. 5 becomes smaller further, however, its multiplication factor of resonant vibrations is increased further. Referring to FIG. 6 showing transmission characteristics of a damper having a yet higher consistency (that is, lower viscosity) of the silicone oil 108 than that of the damper shown in FIG. 5, the resonant frequency $f_0$ of the damper of FIG. 6 becomes yet smaller further, however, its multiplication factor of resonant vibrations is still increased further.

SUMMARY OF THE INVENTION

It is therefore an object of the present invention to provide a damper having transmission characteristics having the multiplication factor of resonant vibrations lowered without increasing the resonant frequency $f_0$.

In one aspect, the present invention provides a damper having its one end mounted on a movable portion, and having its other end mounted on a stationary portion, in which a main body portion formed of a flexible material includes a hollow portion and a protuberant portion having a shaft inserting hole and which is protruding towards the hollow portion. The protuberant portion has an outer diameter not less than 2.3 times the inner diameter of the shaft inserting hole. There is a viscous material enclosed in the hollow portion of the main body portion.

In another aspect, the present invention provides a damper having its one end mounted on a movable portion and having its other end mounted on a stationary portion, in which a main body portion formed of a flexible material includes a hollow portion and a protuberant portion having a shaft inserting hole and which is protruding towards the hollow portion, and in which irregular formations are formed on one of the inner surface of the main body portion and the outer surface of the protuberant portion. There is also a viscous material enclosed in the hollow portion of the main body portion.

In still another aspect, the present invention provides an electronic equipment including an outer casing, a movable portion housed in the outer casing with a pre-set gap from the inner wall of the outer casing, and carrying an electronic circuit, and a shock-absorbing mechanism arranged between the movable portion and the inner wall section of the outer casing. The shock-absorbing mechanism, having its one end mounted on the movable portion and having its other end mounted on the outer casing, includes a damper having a main body portion formed of a flexible material. The main body portion includes a hollow portion and a protuberant portion having a shaft inserting hole and which is protruding towards the hollow portion. The protuberant portion has an outer diameter not less than 2.3 times the inner diameter of the shaft inserting hole. There is enclosed a viscous material enclosed into the hollow portion of the main body portion.

In yet another aspect, the present invention provides an electronic equipment including an outer casing, a movable portion housed in the outer casing with a pre-set gap from the inner wall of the outer casing the movable portion carrying an electronic circuit and a shock-absorbing mechanism arranged between the movable portion and the inner wall section of the outer casing, wherein the shock-absorbing mechanism, having its one end mounted on the movable portion and having its other end mounted on the outer casing, includes a damper having a main body portion formed of a flexible material. The main body portion has a hollow portion and a protuberant portion including a shaft inserting hole and which is protruding towards the hollow portion. One of the inner surface of the main body portion and the outer surface of the protuberant portion has irregular formations. There is enclosed a viscous material enclosed into the hollow portion of the main body portion.

DESCRIPTION OF THE INVENTION

Figure 1:
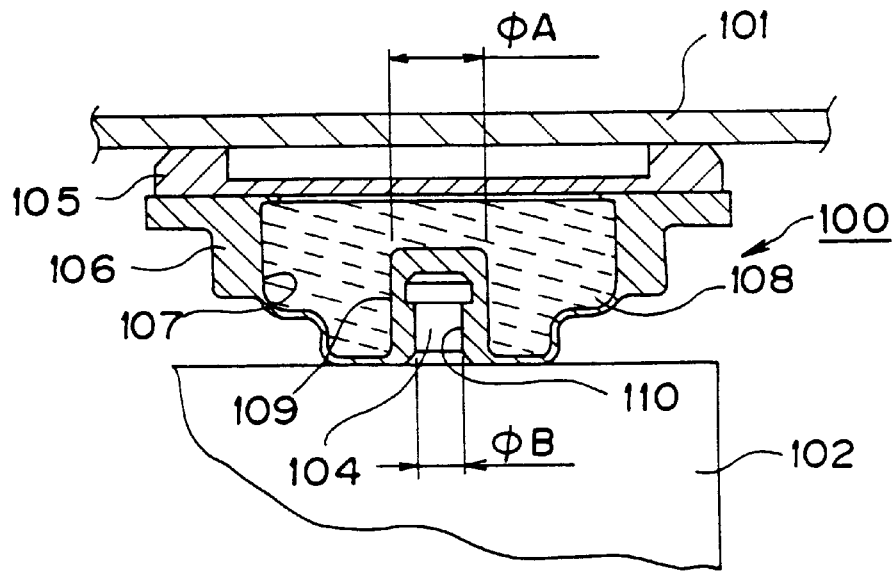
FIG. 1 is a transverse cross-sectional view showing the structure of a conventional damper.

Referring to the drawings, preferred embodiments of a damper according to the present invention will be explained in detail.

Figure 8:
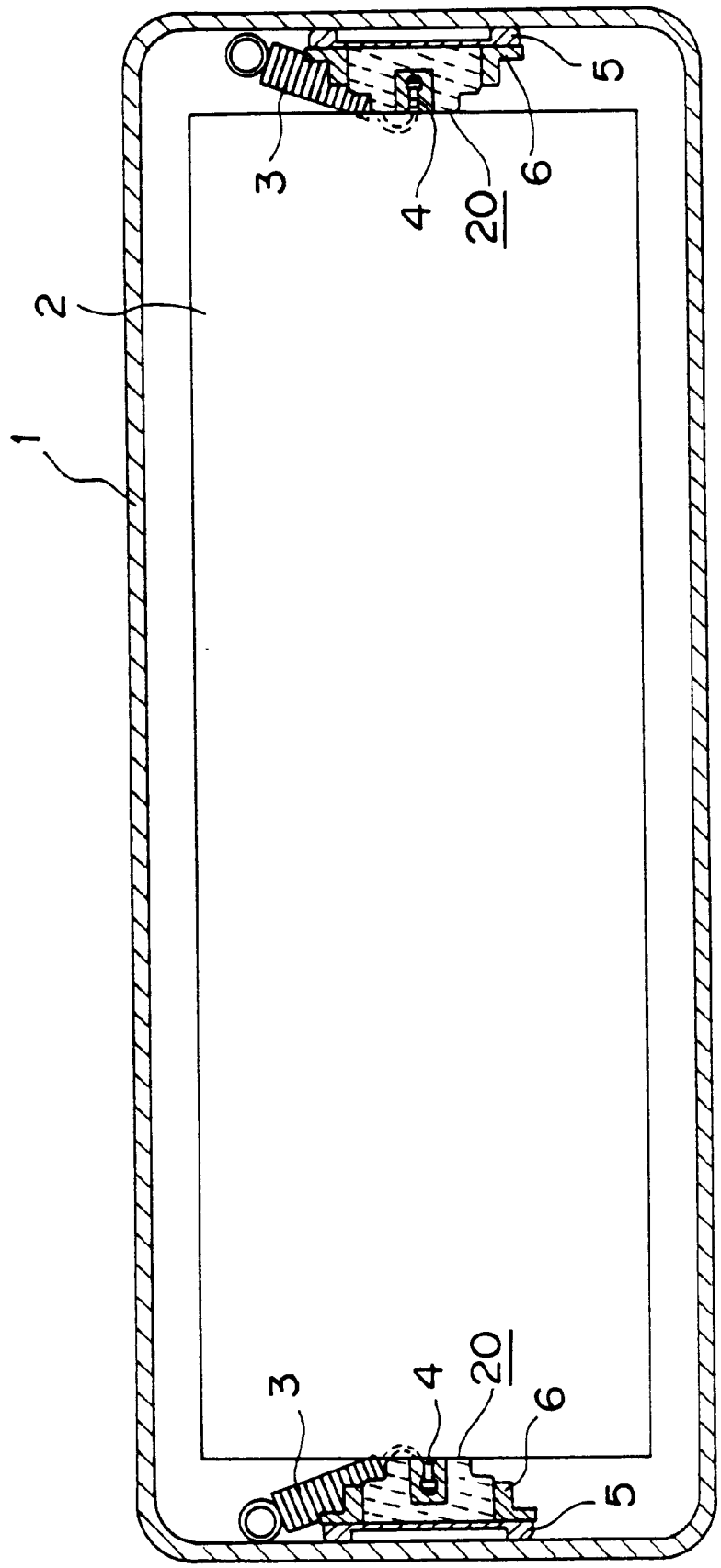
FIG. 8 is a longitudinal cross-sectional view showing the structure of the disc player device shown in FIG. 7.

A damper according to the present invention is interposed between a stationary portion supporting a supported member and the supported member for suppressing or inhibiting propagation of vibrations or impacts to the supported member and for supporting the supported member for movement relative to the stationary portion. The damper embodying the invention is applied to a disc player as an electronic equipment in which a disc reproducing unit as the supported member is supported for movement relative to the outer casing 1 as the stationary portion on application of impacts from outside to the outer casing 1. In the present disc player, the disc reproducing unit 2 is housed in the disc player with a pre-set gap from the inner wall section of the outer casing 1, and is supported for movement relative to the outer casing 1 adjacent to the inner wall section of the outer casing 1 via four dampers 20 provided as a pair on each of the outer wall sections of the lateral sides of the outer casing 1. Between the disc reproducing unit 2 and the outer casing 1 are arranged a pair of suspension springs 3, 3. The disc driver 2 is supported by having its lateral sides suspended via suspension springs 3, 3 from the inner wall sections of the outer casing 1, as shown in FIG. 8.

The disc reproducing unit 2 is adapted for reproducing a disc-shaped optical recording medium (abbreviated herein as an optical disc), such as a so-called compact disc, and includes a disc rotating driving unit and an optical pickup device, both not shown. The disc rotating driving unit holds and rotationally drives the optical disc. The optical disc is an information recording medium having a disc substrate of a transparent material and a signal recording layer formed on its major surface. The optical pickup device reads out information signals from the optical disc rotationally driven by the disc rotating driving unit for forwarding the read-out signals to a reproducing circuit, such as a demodulation circuit.

Figure 9:
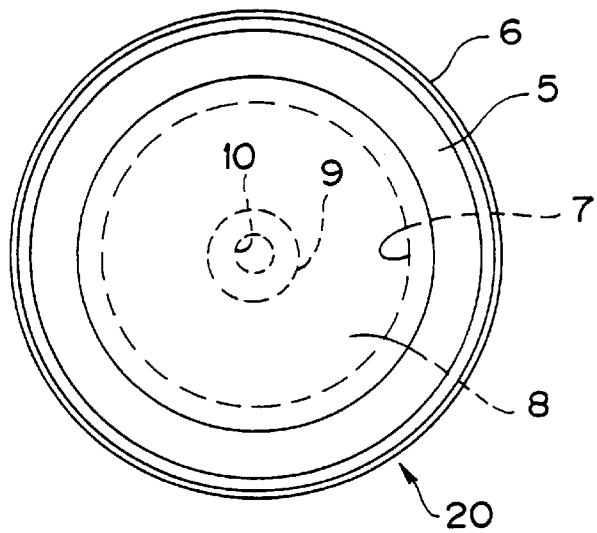
FIG. 9 is a front view showing the structure of the damper shown in FIG. 7.
Figure 10:
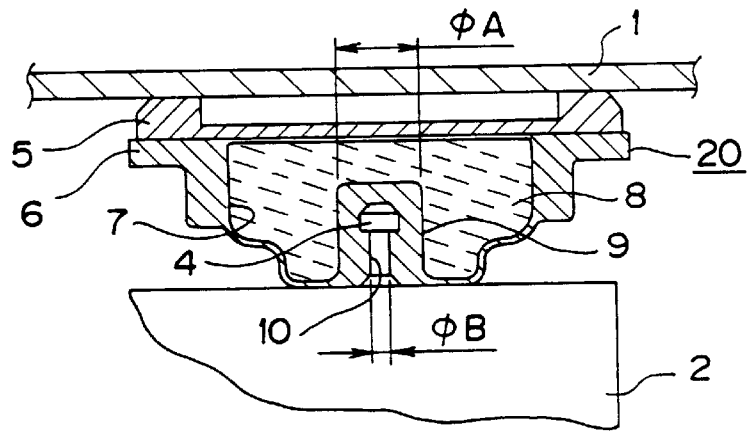
FIG. 10 is a transverse cross-sectional view showing the structure of the damper shown in FIG. 7.

The damper 20 includes a bag-shaped main body portion 6 formed of a flexible material. The material of the main body portion 6 may be made of butyl rubber (isobutylene isoprene rubber or IIR), elastomer or silicon rubber. The opening end of the main body portion 6 is closed by a flat-plate-shaped lid 5 for delimiting a hermetically enclosed hollow portion 7, as shown in FIG. 10. This hollow portion 7 is charged with a silicone oil 8, which in a viscous liquid. This damper 20 has, in the hollow portion 7 formed as one with the main body portion 6, a pillar-shaped portion 9 which is substantially columnar-shaped and is formed with a shaft-inserting hole 10 extending along is axis, as shown in FIGS. 9 and 10. The distal end of the shaft-inserting hole 10 has an opening directed to outside of the damper 20.

Figure 11:
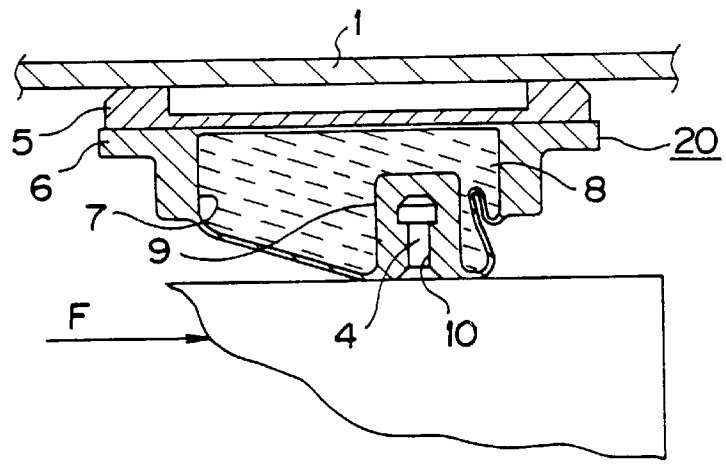
FIG. 11 is a transverse cross-sectional view showing the deformed state of the damper shown in FIG. 7.

With the present damper 20, the lid 5 is secured to the inner wall section of the outer casing 1, whilst a pivot shaft 4 set upright on the outer wall section of the disc reproducing unit 2 is fitted into the shaft-inserting hole 10, as shown in FIG. 10. If vibrations or impacts are applied to the outer casing 1 from outside, the main body portion 6 is deformed, while the silicon oil 8 flows in the hollow portion hollow portion 7, as shown in FIG. 11, for attenuating the vibrations or impacts and for suppressing or inhibiting propagation thereof to the disc reproducing unit 2. Since the force tending to shift the disc reproducing unit 2 with respect to the outer casing 1 is in operation, as shown by arrow F in FIG. 11, the main body portion 6 of the damper 20 becomes deformed to cause the pillar-shaped portion 9 to be moved within the disc reproducing unit 2. When the pillar-shaped portion 9 is moved in this manner, the silicone oil 8 acts as a resistance to suppress the velocity of movement of the pillar-shaped portion 9. By the velocity of movement being thus suppressed by the silicone oil 8, the vibrations or impacts are attenuated to prevent propagation of the impacts.

Figure 2:
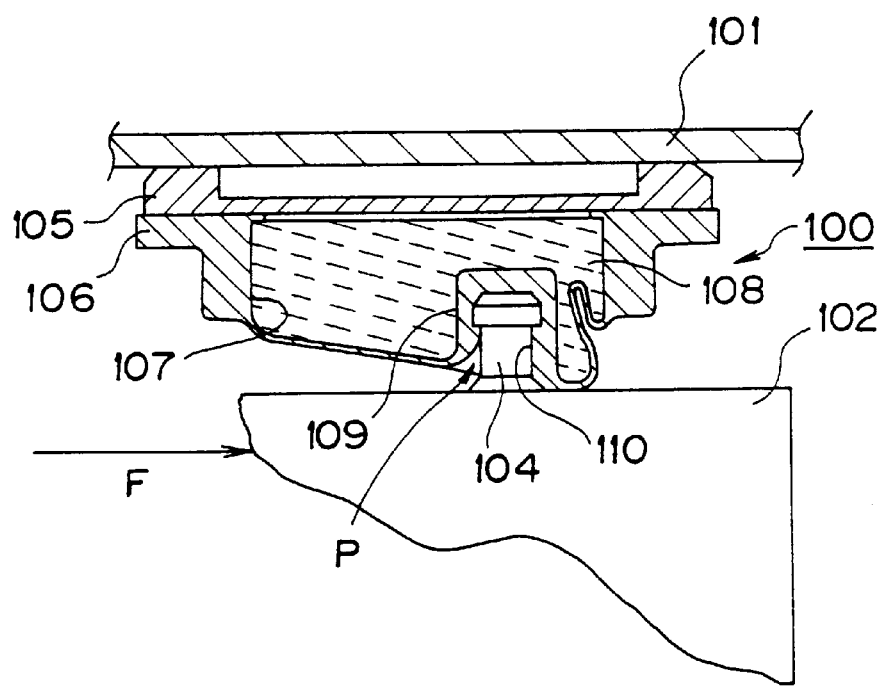
FIG. 2 is a transverse cross-sectional view showing the deformed state of the conventional damper.
Figure 3:
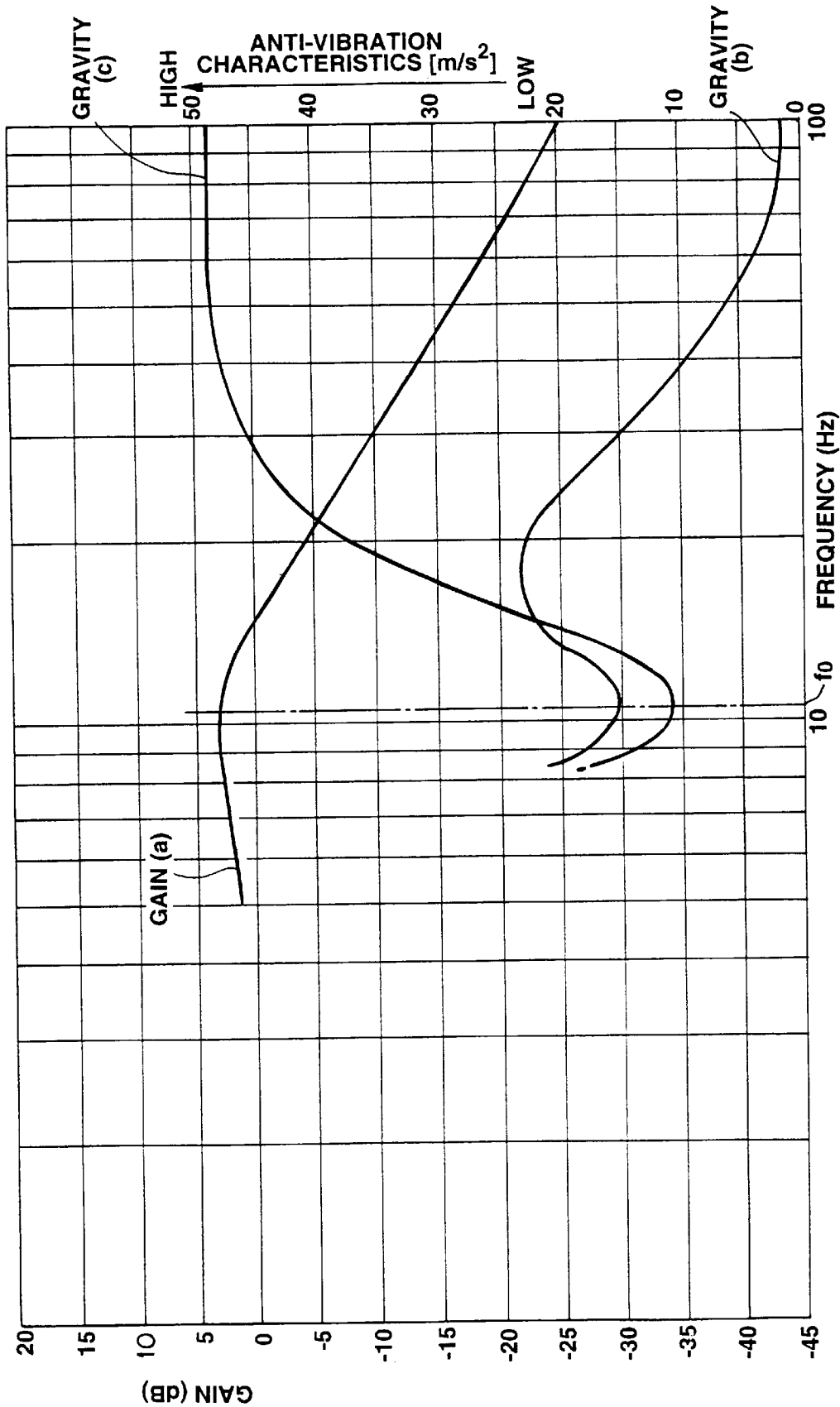
FIG. 3 is a graph showing vibration transmission characteristics of the conventional damper and anti-vibration characteristics of the disc player device.
Figure 4:
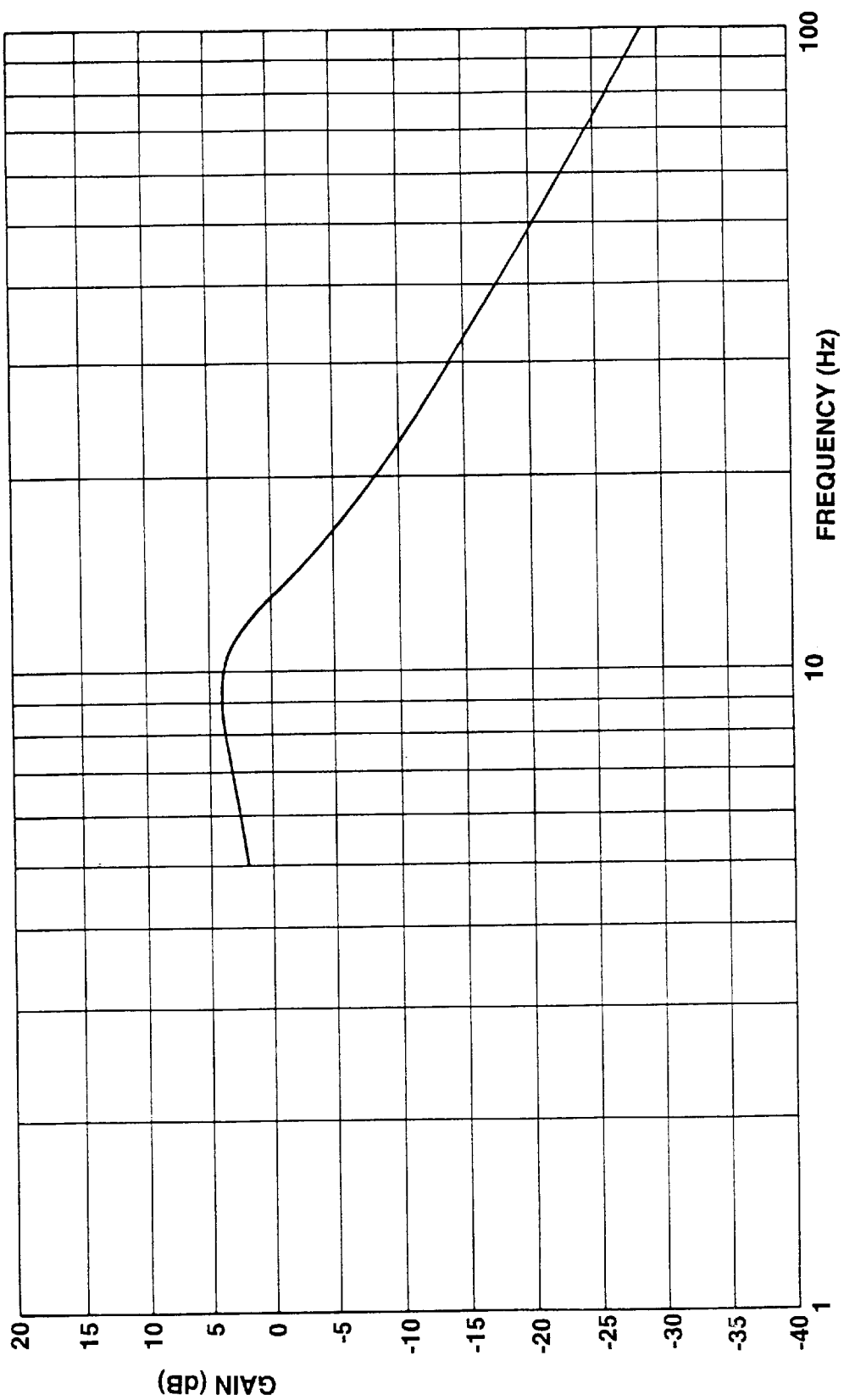
FIG. 4 is a graph showing vibration transmission characteristics for a case wherein consistency of the silicone oil in the conventional damper is raised beyond that of the damper having vibration transmission characteristics shown in FIG. 3.
Figure 5:
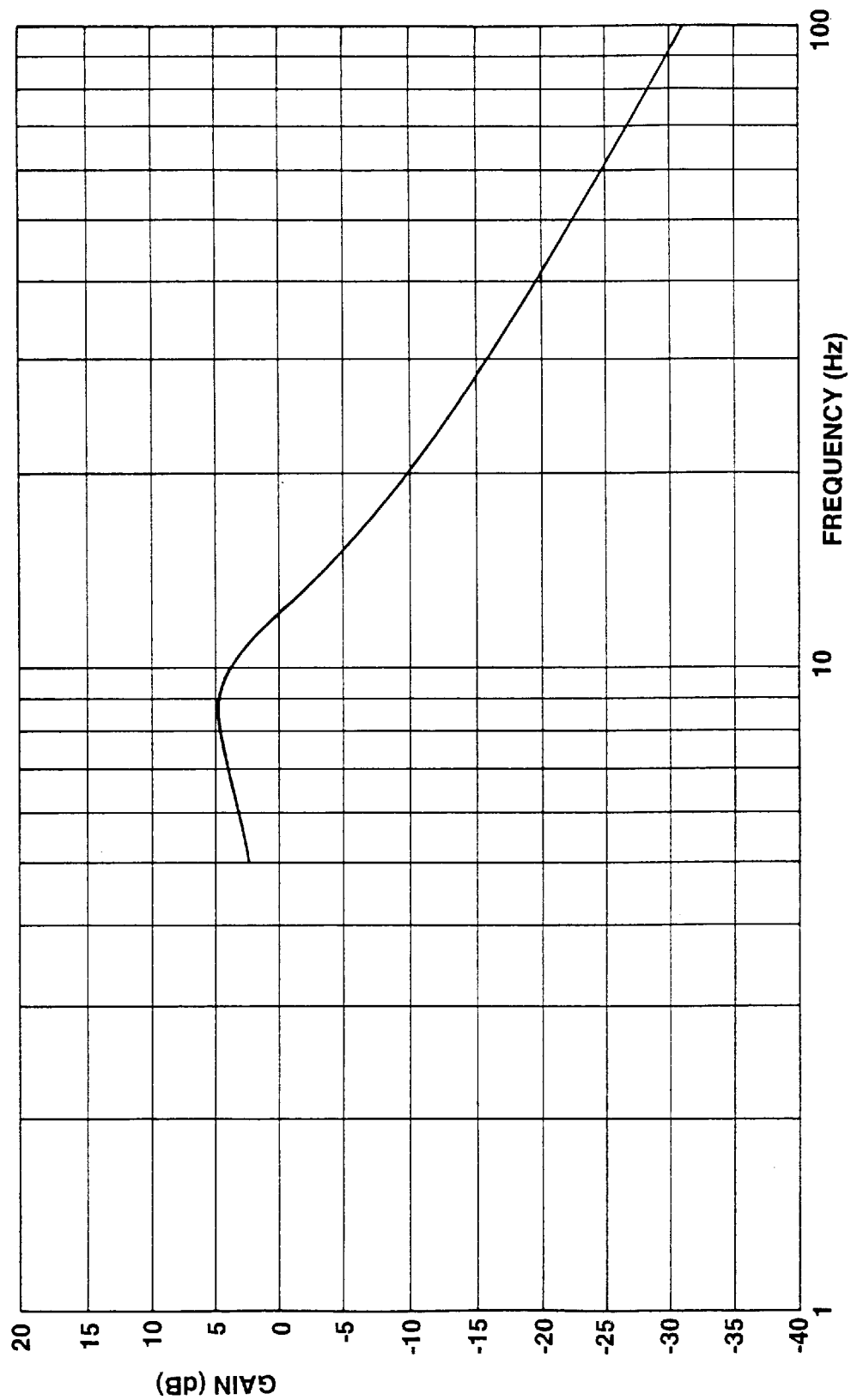
FIG. 5 is a graph showing vibration transmission characteristics for a case wherein consistency of the silicone oil in the conventional damper is raised beyond that of the damper having vibration transmission characteristics shown in FIG. 4.
Figure 6:
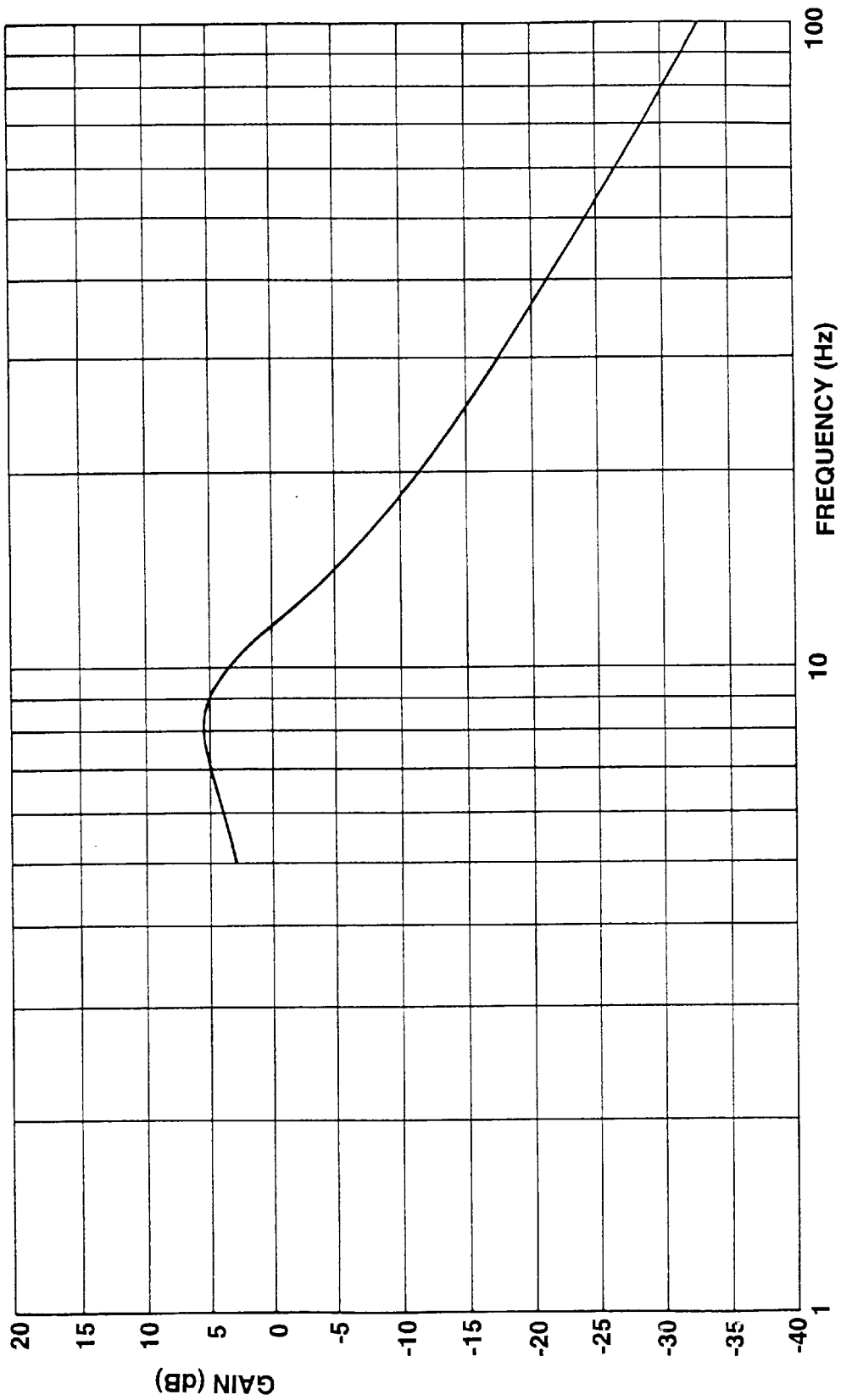
FIG. 6 is a graph showing vibration transmission characteristics for a case wherein consistency of the silicone oil in the conventional damper is raised beyond that of the damper having vibration transmission characteristics shown in FIG. 5.
Figure 7:
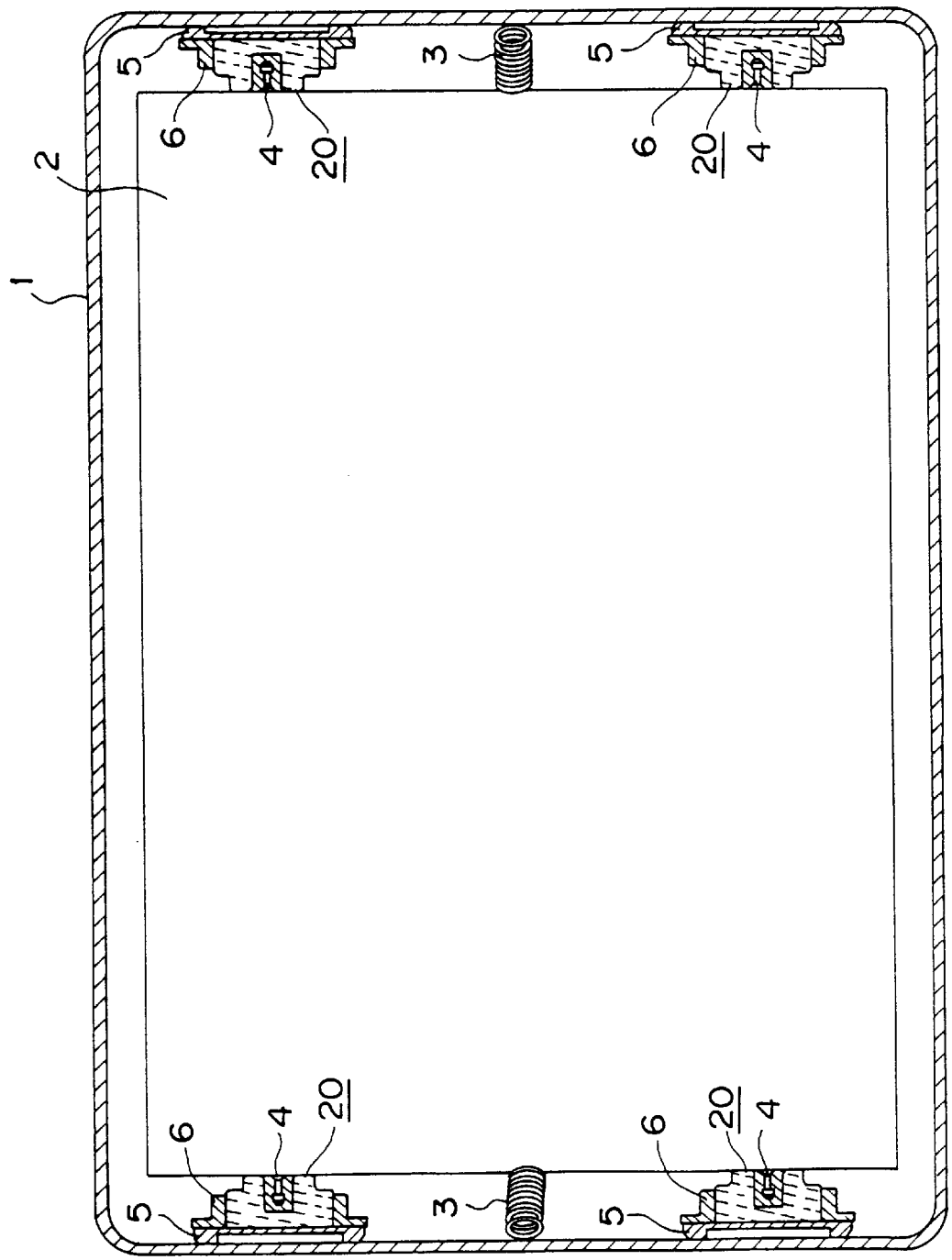
FIG. 7 is a transverse cross-sectional view showing the structure of a disc player device having a damper according to the present invention.

With the present damper 20, the outer diameter A of the pillar-shaped portion 9 shown at φA in FIG. 10 is not less than 2.3 times the inner diameter B of the shaft-inserting hole 10 indicated by φB in FIG. such that the pillar-shaped portion 9 has a sufficient wall thickness. Specifically, as indicated by our experiments, if the main body portion of the damper is severely deformed under the condition of A/B<2.3, as shown in FIG. 2, a gap P is produced. However, if A/B≧2.3, the pillar-shaped portion 9 is not deformed, as shown in FIG. 11, even although the main body portion 6 is deformed severely due to significant movement of the disc reproducing unit 2 relative to the outer casing 1, because the pillar-shaped portion 9 has a sufficient holding power to keep up its own shape, such that there is produced no gap between the inner surface of the shaft-inserting hole 10 and the pivot shaft 4, as shown in FIG. 2. The result is that the multiplication factor of the resonant vibration Q as the vibration transmission characteristics of the damper 20, corresponding to the gain of the vibrations propagated at the resonant frequency $f_0$, is not increased, as explained subsequently, thus assuring sufficient suppression of the gain of the vibrations in the high frequency range and superior anti-vibration characteristics of the disc reproducing unit 2 inclusive of the damper 20.

Since the multiplication factor of the resonant vibration Q of the damper 20 is suppressed to a smaller value, it becomes possible to suppress the amplitude of the vibrations of the disc reproducing unit 2 relative to the outer casing 1 at the resonant frequency $f_0$ for preventing the disc reproducing unit 2 from impinging against the inner wall section of the outer casing 1. That is, with the use of the present damper, the gap defined between the disc reproducing unit 2 and the inner wall section of the outer casing 1 can be reduced, thus enabling the outer casing 1 to be reduced in size.

Next, a damper 21 of a second embodiment of the present invention is explained by referring to the drawings. The parts or components similar to the previous embodiment are denoted by the same reference numerals.

Figure 12:
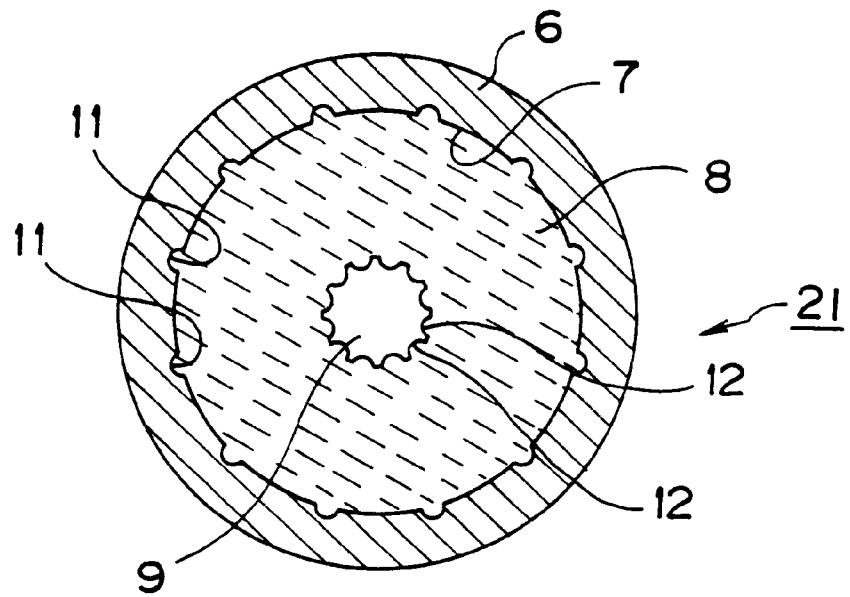
FIG. 12 is a longitudinal cross-sectional view showing the structure of a modified damper (having a groove) according to the present invention.
Figure 13:
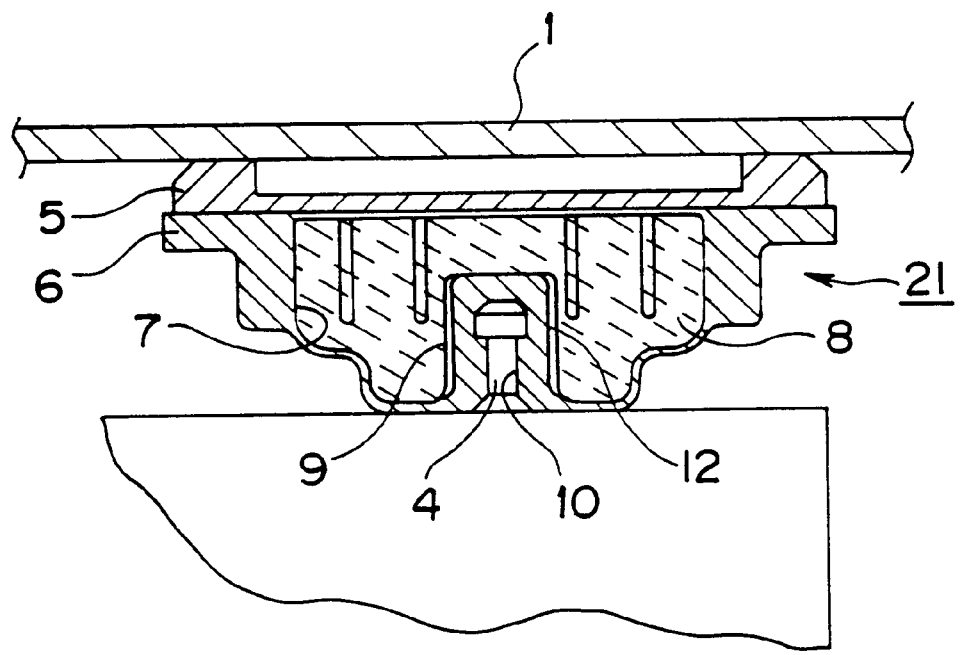
FIG. 13 is a transverse cross-sectional view showing the structure of the damper shown in FIG. 12.

The damper 21 of the second embodiment may be formed with grooves 11, 12, operating as irregular formations, in at least one of the inner surface of the main body portion 6 and the outer peripheral surface of the pillar-shaped portion 9. These grooves 11, 12 may be formed in both of the inner surface of the main body portion 6 and the outer peripheral surface of the pillarshaped portion 9, as shown in FIG. 12. If these grooves 11, 12 are formed, the resistance offered by the silicone oil 8 to the movement of the pillar-shaped portion 9 is increased. Thus, the multiplication factor of the resonant vibration Q may be diminished without increasing the resonant frequency $f_0$ and without the necessity of setting the outer diameter A of the pillar-shaped portion 9 so as to be not less than 2.3 times the inner diameter B of the shaft-inserting hole 10.

The above-described damper 21 of the second embodiment was formed by butyl rubber (IIR) having the hardness Hs equal to 23° and silicone oil with the consistency of 315 (mm×10) was used as the silicone oil 8. Measurement was made of the vibration transmission characteristics of the damper. The consistency of the silicon oil is in keeping with the indication prescribed in JISK220.

Figure 14:
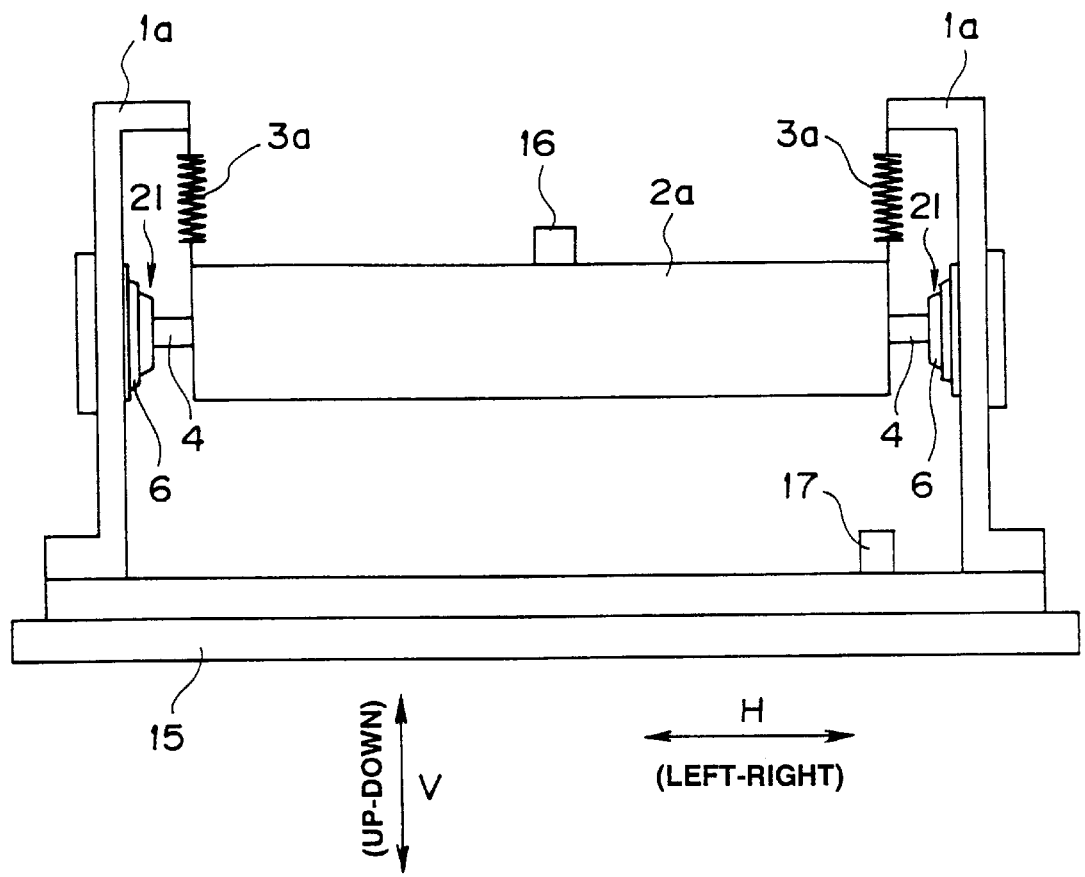
FIG. 14 is a front view showing the structure of a device for measuring vibration transmission characteristics.

The device used for measurement is shown in FIG. 14, in which a pair of supporting arms 1a, 1a operating as a stationary portion are set upright on a base 15. These supporting arms 1a, 1a support the supported member 2a via a pair of suspension springs 3a, 3a and a damper 21. The supported member 2a is a rigid body weighing 1440 gf. On both sides of the supported member 2a are set upright two pairs of supporting shafts 4, one on each lateral side. The suspension springs 3a, 3a are arranged between both lateral sides of the supported member 2 and the supporting arms 1a, 1a for supporting the supporting member 2a by the supporting arms 1a, 1a. The supporting springs 3a, 3a were each of the spring constant of 58 gf/mm. Between the supported member 2a and the supporting arms 1a, 1a are arranged four dampers 21 in association with the supporting shafts 4. Each supporting shaft 4 is fitted into the shaft-inserting hole 10 of the damper 21. The lid 5 of each damper 21 is secured to the supporting arms 1a, 1a.

On the base 15 is mounted a first acceleration pickup 17 adapted for measuring the acceleration of vibrations of the base 15. On the supported member 2a is mounted a second acceleration pickup 16 adapted for measuring the acceleration of vibrations of the supported member 2a. The base 15 is vibrated in the horizontal direction (left-and-right direction) shown by arrow H and in the vertical direction (up-and-down direction) shown by arrow V in FIG. 14. The vibrations of the base 15 represent input vibrations. The vibration transmission characteristics, namely the intensity of the vibrations of the supported member 2a relative to the input vibrations, are measured.

Figure 15:
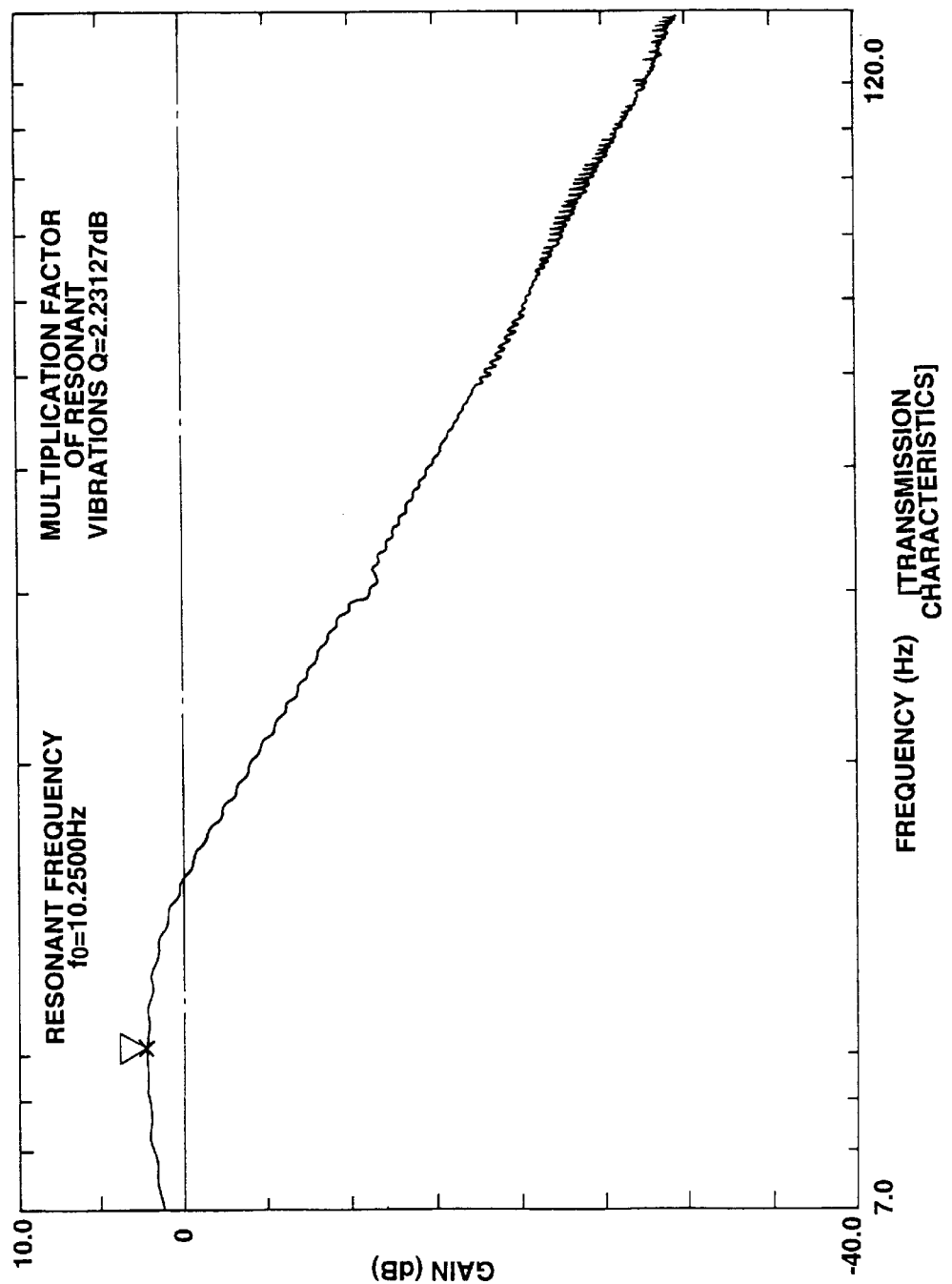
FIG. 15 is a graph showing vibration transmission characteristics of a damper (having a groove with A/B≧2.3 according to the present invention).
Figure 16:
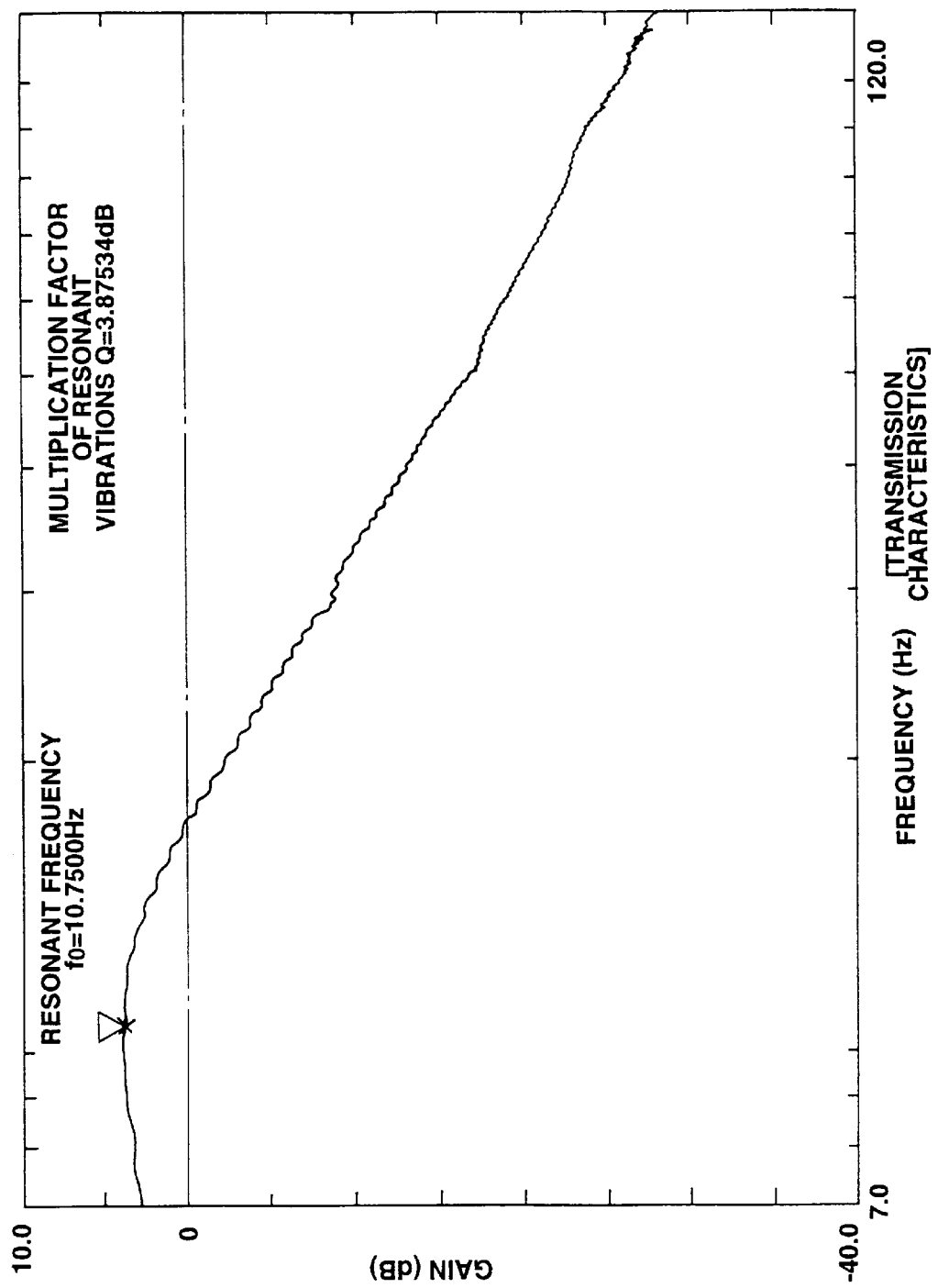
FIG. 16 is a graph showing vibration transmission characteristics of a damper (with A/B≧2.3 according to the present invention).

For the case in which the outer diameter A of the pillar-shaped portion 9 of the damper 21 is equal to not less than 2.3 times the inner diameter of the shaft-inserting hole 10, and grooves 11, 12 are provided in the inner surface of the main body portion 6 and the outer peripheral surface of the pillar-shaped portion 9, the measured transmission characteristics were such that the resonant frequency $f_0$ was 10.2500 Hz and the multiplication factor of the resonant vibration Q (corresponding to the gain of the vibrations propagated at the resonant frequency $f_0$) was 2.23127 dB, as shown in FIG. 15.

The transmission characteristics shown in FIG. 15 are compared to those of a damper of a comparative example in which the outer diameter A of the pillar-shaped portion is less than 2.3 times the inner diameter of the shaft-inserting hole and there are no irregular formations in the inner surface of the main body portion. Under the same measurement conditions, the transmission characteristics of the damper of the comparative example are such that the resonant frequency fo is 10.7500 Hz and the multiplication factor of the resonant vibration Q is 3.87534 dB. That is, the transmission characteristics of the damper of the second embodiment are such that the multiplication factor of the resonant vibration Q is lower than that of the damper of the comparative example without increasing the resonant frequency $f_0$. In the damper 21 according to the present second embodiment, the gain of the vibrations propagated from the base 15 to the supported member 2a is maximum at the resonant frequency $f_0$. and becomes lower the higher the frequency is than the resonant frequency $f_0$. Turning to the anti-vibration characteristics of the above-described disc reproducing unit 2 by itself, there is raised a problem if the anti-vibration characteristics are low in the frequency range higher than 20 to 30 Hz, since the resonant frequency of the optical disc, for example, the compact disc itself, is on the order of 100 Hz. However, if the anti-vibration characteritics of the disc reproducing unit 2 and those of the damper of the second embodiment are synthesized together, sufficient anti-vibration characteristics can be realized in a frequency range higher than 20 to 30 Hz.

Figure 18:
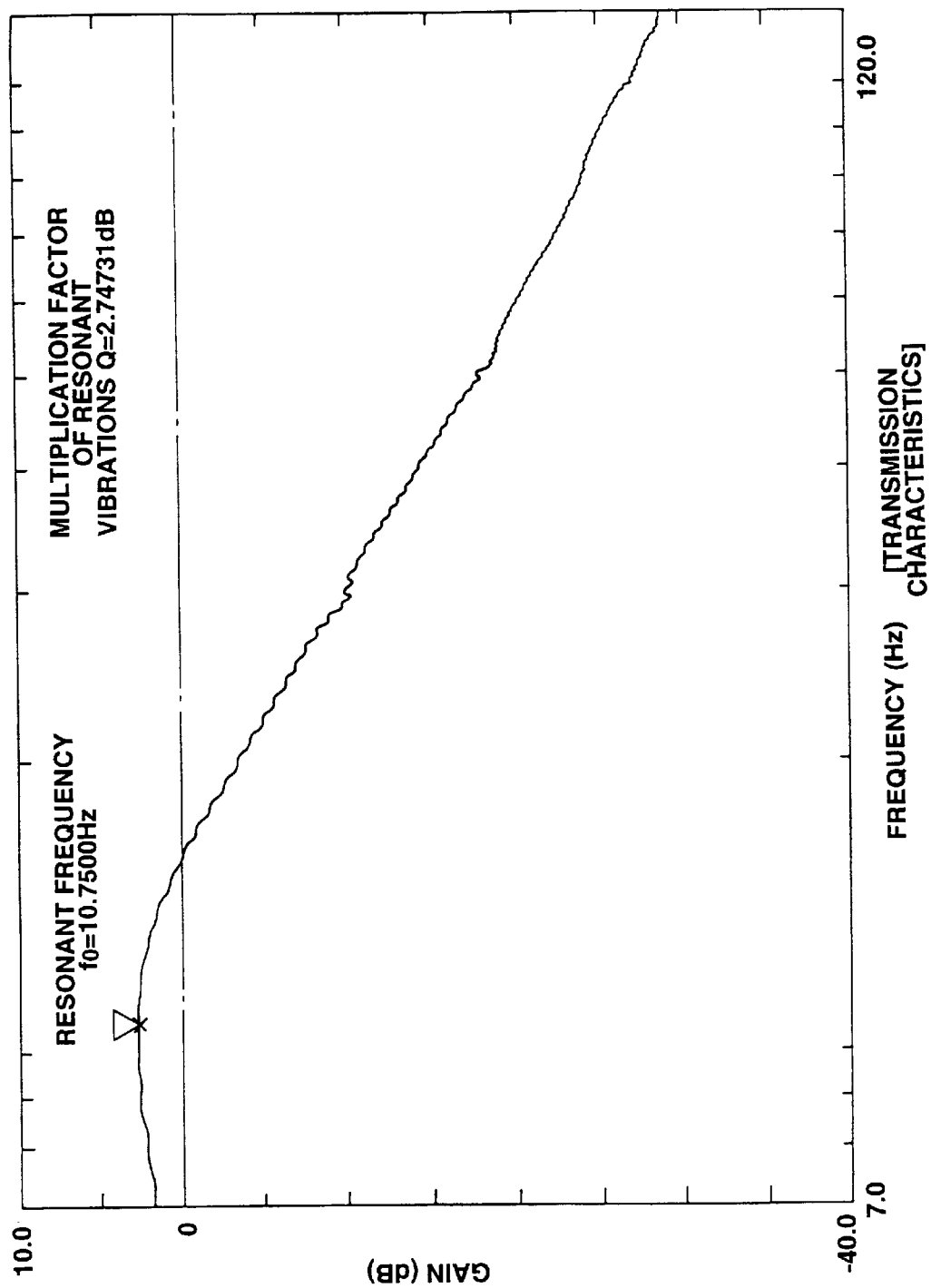
FIG. 18 is a graph showing vibration transmission characteristics of a conventional damper for comparison with vibration transmission characteristics of the damper according to the present invention.
Figure 19:
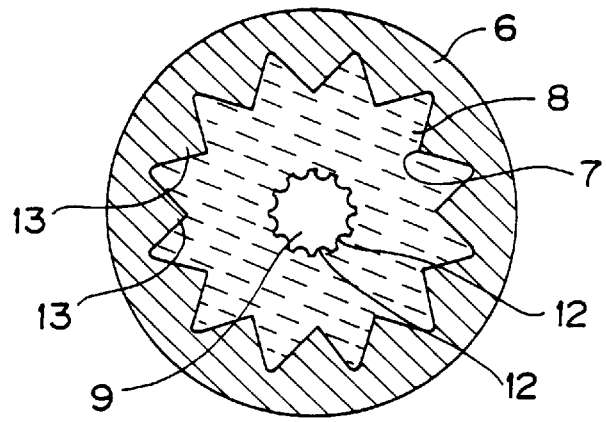
FIG. 19 is a longitudinal cross-sectional view showing the structure of a modified damper (having bellows-like irregular formations) according to the present invention.

A damper of the first embodiment was formed of the same material as that of the above-described second embodiment so that the outer diameter A of the pillar-shaped portion 9 will be not less than 2.3 times the inner diameter of the shaft-inserting hole 10, using the same silicone oil as that used in the above-described second embodiment, and measurement was made of the transmission characteristics under the same measurement conditions as described above. The transmission characteristics of the damper 20 were such that the resonant frequency $f_0$ is 10.7500 Hz and the multiplication factor of the resonant vibration Q was 2.74731 dB, as shown in FIG. 18. In this embodiment, the resonant frequency fo was 10.7500 Hz, with the multiplication factor of the resonant vibration Q being 2.74731 dB. In this embodiment, the transmission characteristics were such that the multiplication factor of the resonant vibration Q was lower than those of the damper of the comparative example without the resonant frequency $f_0$ being lowered.

Figure 20:
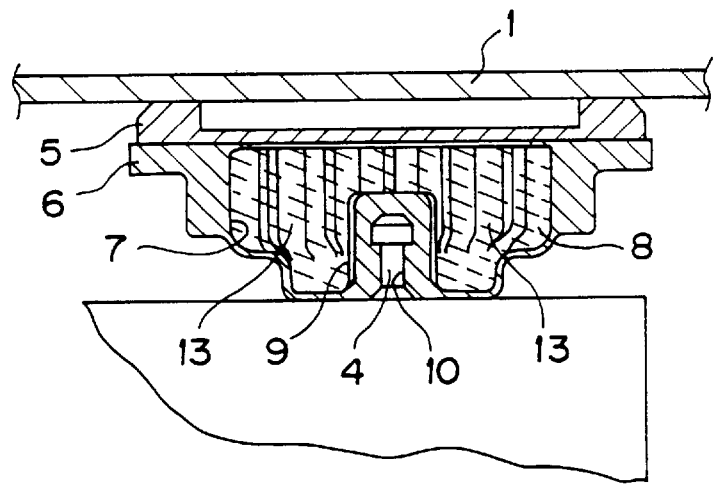
FIG. 20 is a transverse cross-sectional view showing the structure of the damper shown in FIG. 19.

In the above-described second embodiment, the irregular formations provided on one or both of the outer peripheral surfaces of the pillar-shaped portion 9 and the inner surface of the main body portion 6 may be bellows-shaped irregular formations 13, instead of being grooves 11, 12 formed in the outer peripheral surface of the pillar-shaped portion 9 and the inner surface of the main body portion 6. In the present modification, the outer diameter A of the pillar-shaped portion 9 may be equal to 2.3 times the inner diameter B of the shaft-inserting hole 10, if so desired, as shown in FIG. 20. In the present modification, since the resistance offered by the silicone oil 8 to the movement in the hollow portion hollow portion 7 of the pillar-shaped portion 9 is increased, the multiplication factor of the resonant vibration Q can be decreased without increasing the resonant frequency $f_0$.

Figure 21:
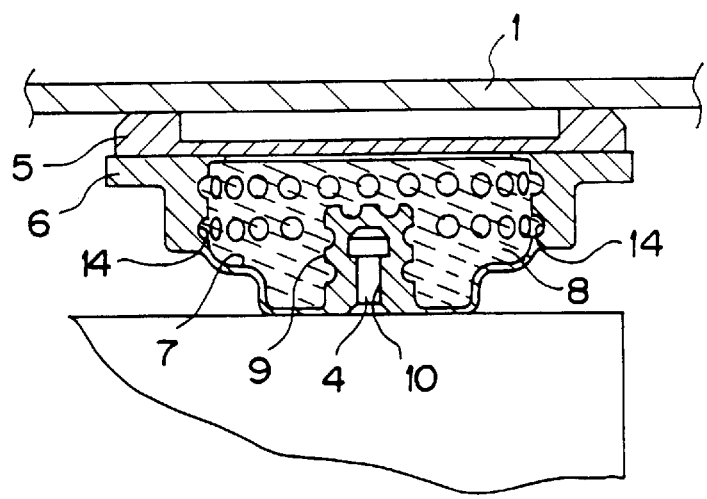
FIG. 21 is a longitudinal cross-sectional view showing the structure of another modified damper (having circular-shaped irregular formations or dimples) according to the present invention.

By way of a further modification, the irregular formations formed on one or both of the outer peripheral surface of the pillar-shaped portion 9 and the inner surface of the main body portion 6 may be circular-shaped formations as shown in FIG. 21. In this further modification, the outer diameter A of the pillar-shaped portion 9 may be equal to not less than 2.3 times the inner diameter B of the shaft-inserting hole 10, if so desired. In the present further modification, since resistance offered by the silicone oil 8 to the movement in the hollow portion hollow portion 7 of the pillar-shaped portion 9 is increased, the multiplication factor of the resonant vibration Q can similarly be decreased without increasing the resonant frequency $f_0$.

Figure 17:
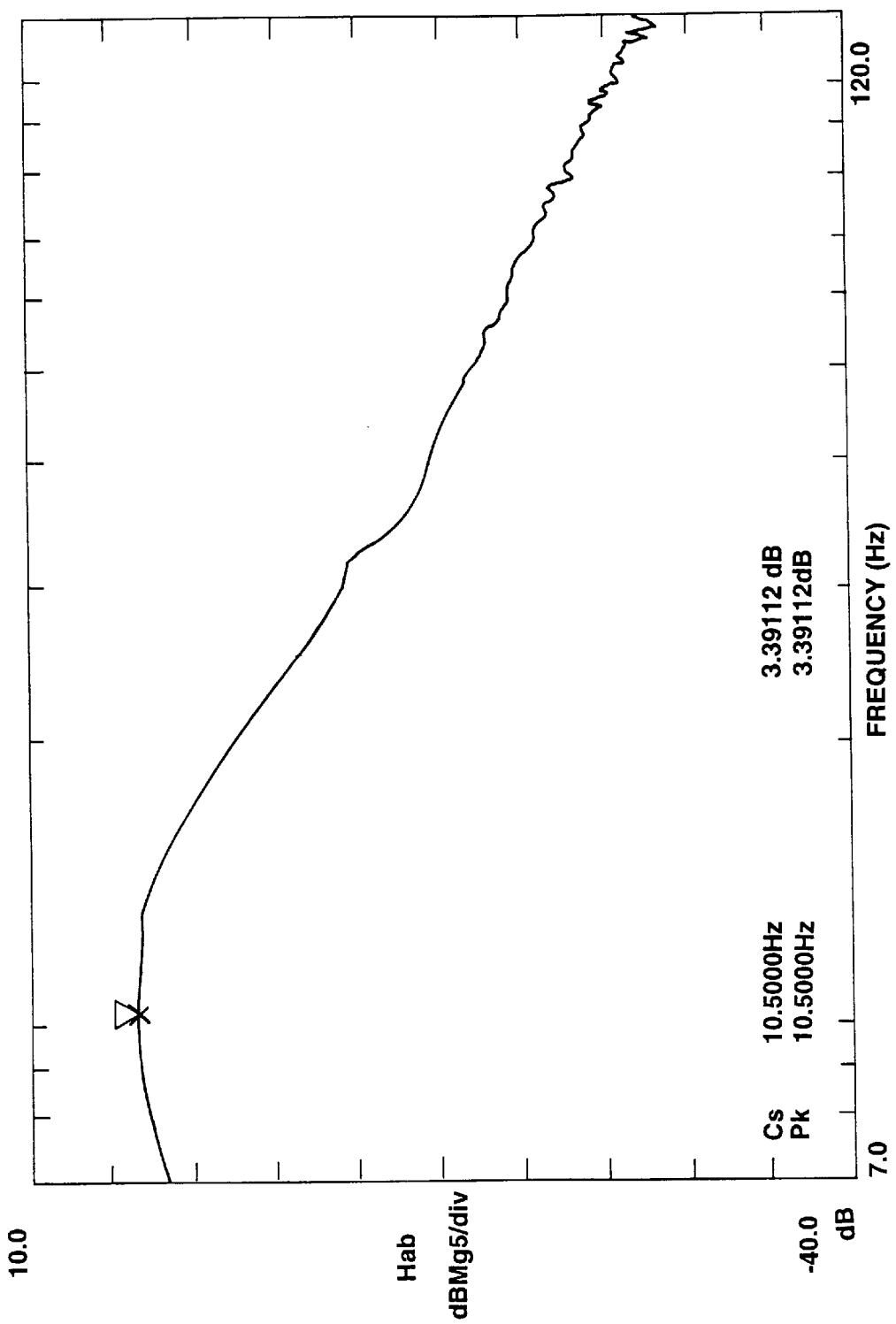
FIG. 17 is a graph showing vibration transmission characteristics of the damper (with A/B≧2.3 according to the present invention).

For confirming the effect of the irregular formations provided on the outer peripheral surface of the pillar-shaped portion 9 and the inner surface of the main body portion 6 in the second embodiment, measurements were made of transmission characteristics of a damper, as a further damper, in which the outer diameter A of the pillar-shaped portion is less than 2.3 times the inner diameter of the shaft inserting hole and in which no irregular formations are provided on the outer peripheral surface of the pillar-shaped portion 9 and the inner surface of the main body portion 6. The measured results are shown in FIG. 17, from which it is seen that the multiplication factor of the resonant vibration Q is 3.39112 dB, than the resonant frequency $f_0$ being 10.5000 Hz, and that, in this case, the multiplication factor of the resonant vibration Q is lower than that of the transmission characteristics of a conventional damper, while the resonant frequency is not increased.

What is claimed is:

1. A damper having one end mounted on a movable portion of a device and having another end mounted on a stationary portion of the device, the damper comprising:
   a main body portion formed of a flexible material, said main body portion having a hollow portion and a protuberant portion extending into said hollow portion with a shaft inserting hole formed in said protuberant portion for receiving a shaft mounted on the movable portion, said protuberant portion having an outer diameter at a location extending into said hollow portion of not less than 2.3 times an inner diameter of said shaft inserting hole; and
   a viscous material enclosed within said hollow portion of said main body portion.

2. The damper as claimed in claim 1 wherein irregular formations are formed on both an inner surface of said main body portion and on an outer surface of said protuberant portion.

3. An electronic equipment comprising:
   an outer casing;
   a movable portion housed in said outer casing and being spaced apart from an inner wall of said outer casing by a pre-set gap, said movable portion carrying a disc reproducing unit; and
   a shock-absorbing mechanism connected between said movable portion and the inner wall of said outer casing, wherein
      said shock-absorbing mechanism includes a damper having one end mounted on said movable portion and another end mounted on said outer casing;
      said damper having a main body portion formed of a flexible material, said main body portion having a hollow portion and a protuberant portion extending into said in said protuberant portion for receiving a hollow portion with a shaft inserting hole formed shaft mounted on the movable portion, said protuberant portion having an outer diameter at a location extending into said hollow portion of not less than 2.3 times an inner diameter of said shaft inserting hole; and
      a viscous material enclosed within said hollow portion of said main body portion.

4. The damper as claimed in claim 3 wherein irregular formations are formed on both of an inner surface of said main body portion and an outer surface of said protuberant portion.

* * * * *